Francis Stoker.
Composition for Fuel.
No. 54477. Patented May 1, 1866.
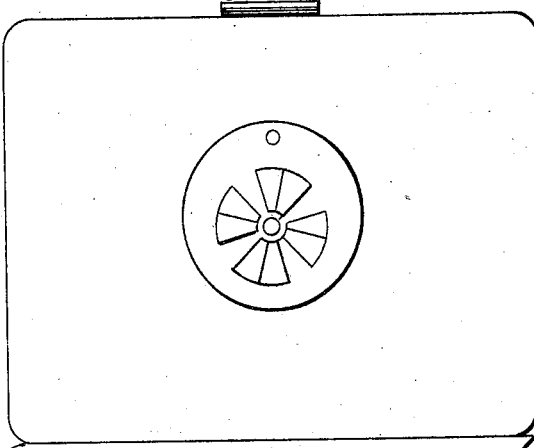
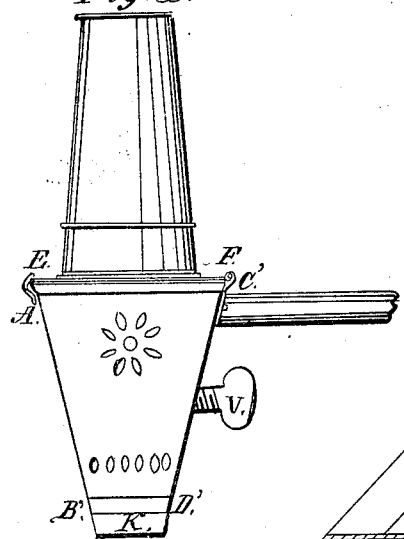
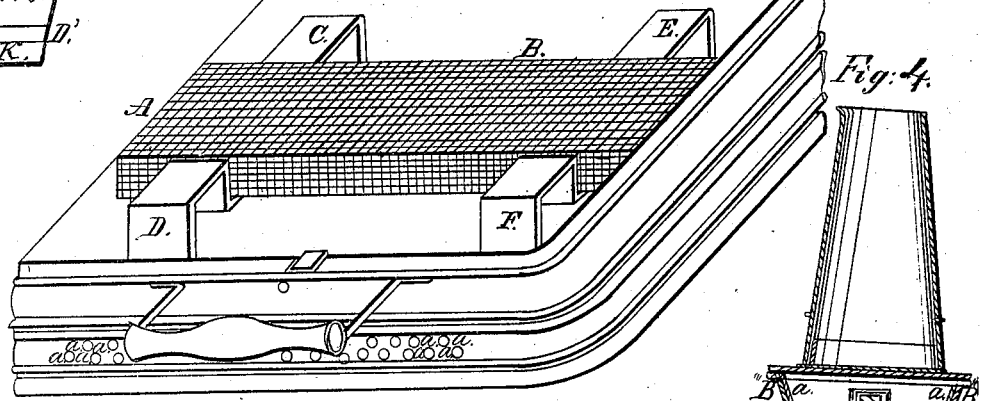
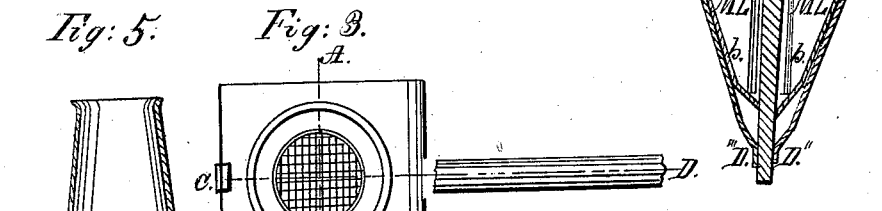
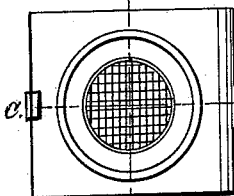
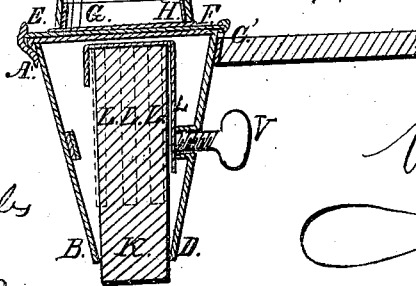
Witnesses:
Inventor:
F. Stoker
by A. Pollok
his atty Francis Stoker.
Composition for Fuel.
No. 54,477. Patented May 1, 1866.
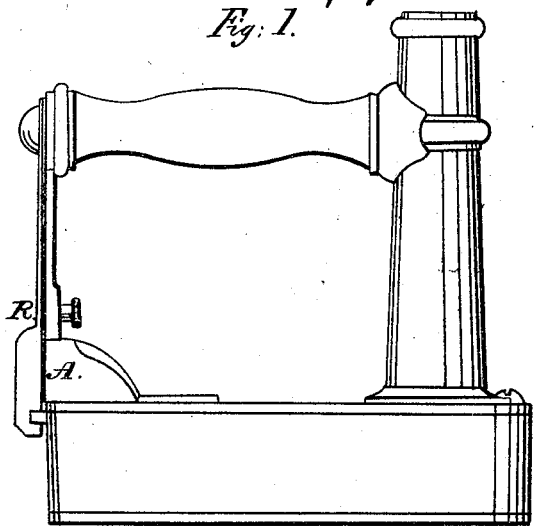
Fig. 1.
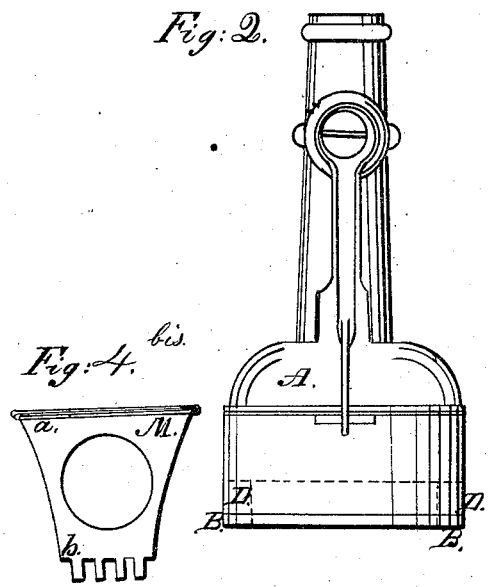
Fig. 2. Fig. 4 bis.
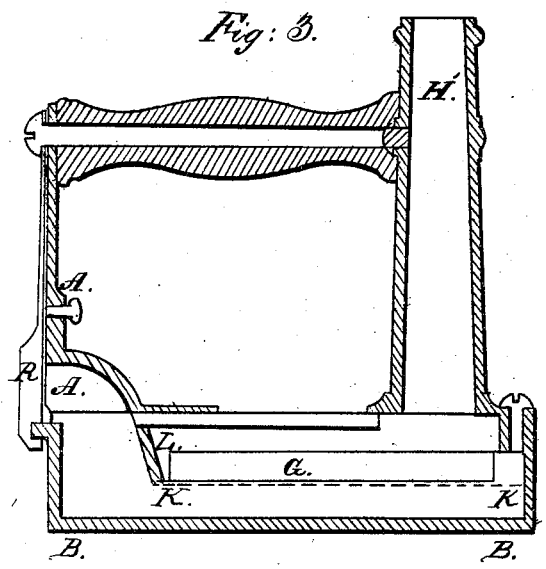
Fig. 3.
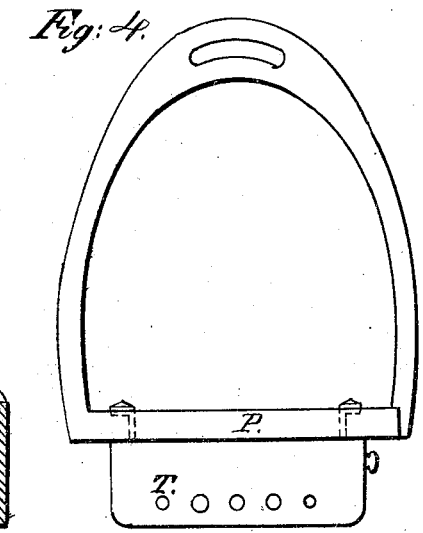
Fig. 4.
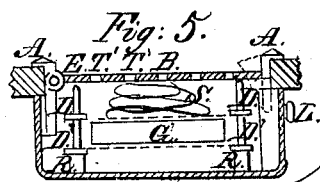
Fig. 5.
Witnesses.
Inventor:
F. Stoker
by A. Pollok
his atty

UNITED STATES PATENT OFFICE.

FRANCOIS STOKER, OF LYONS, FRANCE.

IMPROVED COMPOSITION FOR FUEL.

Specification forming part of Letters Patent No. 54,477, dated May 1, 1866.

*To all whom it may concern:*

Be it known that I, FRANCOIS STOKER, of Lyons, in the Empire of France, have invented a new Chemical Combustible Substance and Apparatus to which it is Applicable; and I do hereby declare that the following is a full and exact description thereof, so as to enable others skilled in the art to make and use my invention.

The combustible substance or fuel the subject of this invention is composed, principally, of carbon obtained from the distillation of light woods in a close receptacle—say two-thirds "fusion" (the charcoal used by artists) reduced to powder, and one-third vinegar charcoal, this latter being part of the residuum of acetic and pyroligneous or spirit of wood or verditer manufactories. To this mixture, which serves as basis, various metallic salts are added, such as nitrates of soda, of potash, or of baryta, which play the part of combustible and oxygenating bodies, their proportions varying with the amount of caloric required from the fuel. Lastly, agglomerating bodies, such as gum-adraganth, fecula, starch, or dextrine, are added, in proportions varying from two to five per cent. The whole having been well triturated can be pressed and molded into very compact cakes, varying in size and form according to their destined use.

This new fuel is very portable by reason of its small volume. It may be lighted by an ordinary lucifer match, and gives out a heat of from 77° Fahrenheit, (25° centigrade,) up to 848° Fahrenheit (400° centigrade) accordingly as its combustion is quickened or slackened. It usually burns very slowly, and disengages neither flame, smoke, smell, or hurtful gases.

It will be understood that the applications of this fuel extend to every object requiring heat, thus, to foot-warmers, chafing-dishes, horsemen's stirrups, smoothing-irons, glue-pots, soldering-irons, furnaces for heating smoothing-irons, tea-urns, coffee-pots, hand-warmers; as a cigar-light in shops and public establishments; to portable kitchens; to heating, finishing, and goffering cylinders; to the apparatus used by hatters, book-binders and gilders; to heating railway and other public or private carriages; finally, to every apparatus where heat or fire is required. In fact and in principle all that is required for the application of this fuel to all these apparatus is simply to place in their interior a box or case of wire-gauze or perforated metal, in which case the fire is placed, the apparatus being provided with suitable openings and regulators for increasing or decreasing the draft.

On the accompanying sheet of drawings, forming part of this specification, are shown several apparatus specially constructed for the consumption of the fuel above described, Figure 1, Sheet I, representing an improved foot-warmer open. In its interior is a wire-gauze case, A B, acting as fire-grate, and with its ends resting on two trestles or sheet-iron supports, G D E F, pivoted to the bottom of the foot-warmer. It is in this case A B that the fuel is placed. On one of the sides of the foot-warmer are one or more rows of small holes, $a\ a\ a$, intended to permit the entrance of the outer cold air to feed combustion. The lid is pierced in the center with a certain number of holes of various shapes intended to permit the exit of hot air from the interior. These holes or openings or designs may be closed entirely or partially either by means of a metal plate sliding between two grooves or by means of a plate turning on a pivot, as shown in the drawings. This plate then acts as a regulator or moderator, and may consequently increase, decrease, or even completely stop, combustion. This moderator might also be placed on one of the lateral sides. It would then consist of a metal band pierced with as many holes as there are in the side for entrance of air, and sliding in grooves. By a come-and-go movement, the holes of this plate alternate with those of the side, and these latter are opened or closed according to the movement.

Figs. 1, 2, and 3, Sheet II, represent, in front and rear elevation and in longitudial section, a smoothing-iron having its source of heat within itself, and thus heating without the necessity of placing it in an oven or on a fire. It is composed of a box having the shape of a smoothing-iron, under which is fitted a piece of polished steel, B B, which forms the bottom. At the back a metal band, L, slightly inclined and crossing the box on its entire breadth, it leaves between itself and the bottom a space of about one-third of an inch. At this height from the bottom is a wire-gauze occupying the whole extent of the iron and resting on the shoulders D D. It is on this wire-gauze that the fuel is placed. This box is then covered by a plate of wrought or cast-iron or other metal fixed on it in the front by a screw, V. A chimney for draft, H', serves at the same time to support the handle screwed into the collar $k\,k$. This handle is supported on the other side by a piece, A', of brass or other material. A steel spring, R, closes the iron after introduction of the fuel. The apparatus being thus put together and provided with its lighted fuel the outer air enters by the opening A strikes against the band L in the direction indicated by arrows, passes under the fuel G G, and rises in the chimney H'.

Figs. 4 and 5, Sheet II, represent, in front view and in longitudinal section, a stirrup furnished with an improved foot-warmer. Two pins with shoulders, R, riveted to the bottom of the apparatus, are intended to fix a small frame, D', covered with wire-gauze, on which rests the fuel. Another similar frame, D, is placed above the fuel, C', and is held in position by a spiral spring, S. The lid B of the warmer, which here constitutes the pedal or foot-plate of the stirrup, may turn on a hinge, E. It is pierced with two or three rows of holes, and is closed by a spring-catch, the knob of which is shown at L. At the two extremeties are two suspension-clasps, A and A'. The two clasps A are fixed, and the two A' are movable, and may be thrown back to the point indicated by the dotted lines when the lid is open. The fixed clasps A are placed on the lateral edge of the stirrup, the two movable ones A' are pushed onto the other edge where the lid B, in falling, fixes them, and the apparatus is then entirely put together.

Figs. 2, 4, and 5, Sheet I, represent, in front view and in longitudinal and transverse section, a soldering-iron having its source of heat within itself. This soldering-iron consists of a metallic box, A' B' C' D', having the shape of a quadrangular truncated pyramid furnished with a lid, E F, pierced with an opening, G H, intended to receive a chimney for draft, and having a wire-gauze to keep the fuel from falling out in case the iron should be about one-third of an inch. Around this plate is placed a small grating, L L L, a press-screw, V, keeping the plate and grating in a fixed position. A small grating of thin sheet-iron, M, Fig. 4 bis, Sheet I, comes on each side B'' D'' B''' D''', and completes the casing in which the fuel is placed. Openings are made in the sides of the box for the entrance of air to feed combustion.

Fig. 3, Sheet I, is a plan of the soldering-iron.

Having now described the nature of the said invention and the means by which it may be carried into practical effect, I would have it distinctly understood that I claim the exclusive use—

1. Of the chemical combustible substance or fuel, to whatever purpose it may be applied.

2. Of the foot-warmer, smoothing-iron, stirrup apparatus, and soldering-iron, the whole substantially as hereinbefore described, and illustrated on the accompanying drawings.

STOKER.

Witnesses:
  P. D. ROUGÉ,
  ED'D DE BOURRAN.